United States Patent
Turcotte

(10) Patent No.: US 9,051,515 B2
(45) Date of Patent: Jun. 9, 2015

(54) ENGINE COOLANT ADDITIVE

(71) Applicant: Ashland Licensing and Intellectual Property LLC, Dublin, OH (US)

(72) Inventor: David E. Turcotte, Lexington, KY (US)

(73) Assignee: Ashland Licensing and Intellectual Property LLC., Dublin, OH (US)

( * ) Notice: Subject to any disclaimer, the term of this patent is extended or adjusted under 35 U.S.C. 154(b) by 0 days.

(21) Appl. No.: 13/833,742

(22) Filed: Mar. 15, 2013

(65) Prior Publication Data

US 2014/0264180 A1    Sep. 18, 2014

(51) Int. Cl.
| | |
|---|---|
| *C09K 15/32* | (2006.01) |
| *C09K 15/20* | (2006.01) |
| *C23F 11/18* | (2006.01) |
| *C23F 11/12* | (2006.01) |
| *C09K 5/10* | (2006.01) |
| *C09K 5/20* | (2006.01) |
| *C23F 11/14* | (2006.01) |
| *C23F 11/08* | (2006.01) |
| *C23F 11/10* | (2006.01) |

(52) U.S. Cl.
CPC ............ *C09K 15/326* (2013.01); *C09K 5/10* (2013.01); *C09K 5/20* (2013.01); *C23F 11/126* (2013.01); *C23F 11/149* (2013.01); *C23F 11/08* (2013.01); *C23F 11/10* (2013.01)

(58) Field of Classification Search
None
See application file for complete search history.

(56) References Cited

U.S. PATENT DOCUMENTS

| | | | |
|---|---|---|---|
| 4,561,990 A | 12/1985 | Darden | |
| 4,647,392 A * | 3/1987 | Darden et al. | 252/75 |
| 5,702,631 A | 12/1997 | Conville et al. | |
| 6,126,852 A | 10/2000 | Turcotte et al. | |
| 6,228,283 B1 | 5/2001 | Turcotte et al. | |
| 6,235,217 B1 | 5/2001 | Turcotte et al. | |
| 6,676,847 B2 * | 1/2004 | Turcotte et al. | 252/76 |
| 7,407,599 B2 * | 8/2008 | Turcotte et al. | 252/73 |
| 2006/0038159 A1 | 2/2006 | Fukutani et al. | |
| 2009/0001312 A1* | 1/2009 | Lievens et al. | 252/75 |
| 2009/0001313 A1* | 1/2009 | Lievens et al. | 252/75 |
| 2009/0090887 A1 | 4/2009 | Choudhary et al. | |
| 2009/0250654 A1 | 10/2009 | Lievens et al. | |
| 2010/0320415 A1* | 12/2010 | Lievens et al. | 252/75 |
| 2011/0006250 A1* | 1/2011 | Lievens et al. | 252/75 |
| 2012/0286197 A1 | 11/2012 | De Kimpe et al. | |

OTHER PUBLICATIONS

European Patent Office, Extended European Search Report, EP App. No. 14159350.9-1357, Jun. 25, 2014, 6 Pages.

* cited by examiner

*Primary Examiner* — Joseph D Anthony
(74) *Attorney, Agent, or Firm* — Wood, Herron & Evans, LLP

(57) ABSTRACT

An engine coolant additive for use in combination with a major amount of a coolant liquid is described. The engine coolant additive has an alkaline pH, and includes a salt of a monobasic carboxylic acid compound, a salt of an azole compound, and from about 25 weight percent to about 35 weight percent water. The additive may optionally include a transition metal compound such as molybdenum-containing compounds to assist in corrosion inhibition.

25 Claims, No Drawings

US 9,051,515 B2

ENGINE COOLANT ADDITIVE

FIELD OF THE INVENTION

The present invention relates generally to engine coolant additives and the methods of producing the same.

BACKGROUND OF THE INVENTION

Engine coolant formulations generally consist of a major amount of a coolant liquid such as ethylene glycol or water and a minor amount of other components like silicates, phosphates, nitrates, borates, molybdates, organic acids, and azoles. Generally, these other components are present in the coolant liquid as salts because the formulation is generally in the pH range of 7 or higher, up to 14. To the extent the engine contains ferrous metals which contact the formulation, a formulation pH greater than 7 facilitates protective film formation on the ferrous metal surface. It should also be noted that a component group such as the borates including borax ($Na_2B_4O_5$ $(OH)_4 \cdot 8H_2O$), which can exhibit an acidic pH at low water levels, but forms an alkaline buffer solution as the water content increases, would similarly be useful.

Identified by function, the additives introducible into the engine coolant formulations include but are not limited to deposit control materials, scale inhibitors, corrosion inhibitors, dyes, defoamers, bitterants, surfactants, freeze point depressants, and biocides.

Some of these components are solids that must be dissolved such as in the major amount of coolant liquid. Some of these components contribute to corrosion inhibition when in a finalized engine coolant formulation. The corrosion inhibiting components are incorporated to prevent pitting and other forms of corrosion that can dramatically shorten the operating life of an engine. While the major amount of coolant liquid can typically be inexpensively obtained close to the sites where engine coolant formulations are prepared from various commercial sources, and can be simply incorporated into the formulation, the minor components generally require more specialized production techniques or production in large volumes in relatively few commercial facilities in order to be economically produced for eventual use in the formulation. Thus, the production of engine coolant formulations with corrosion inhibiting components tends to be centralized in a few locations, with the completed formulations then being shipped long distances to sites where they are put into use. This shipping of large volumes of liquid formulations can add significantly to the cost of the final product.

In many engine coolant formulations, the major amount of coolant liquid is ethylene glycol. Ethylene glycol functions as a freeze point depressant and can be harmful when ingested in sufficient quantities. Nonetheless, engine coolant formulations do not always require the incorporation of a freeze point depressant such as ethylene glycol. For example, the ethylene glycol component would not be needed in marine engines that are constantly running or in engines used in tropical environments. In those instances, the major amount of liquid may be water, which is readily available and non-toxic. In other instances, such as in arctic conditions, the freeze point depressant qualities of ethylene glycol or a liquid alcohol freeze point depressant is an absolute requirement.

In addition, safety considerations related to freeze point depressants like ethylene glycol make shipping engine coolants containing this material difficult and costly, in addition to the cost associated with shipping this volume of material. It is thus desirable to lower both the risk associated with the use of materials like ethylene glycol, as well as the shipping cost associated with the volume of material being transported.

SUMMARY OF THE INVENTION

An aspect of the invention is directed to an engine coolant additive that overcomes the deficiencies of prior art engine coolant formulations. The engine coolant additive has an alkaline pH, and includes a salt of a monobasic carboxylic acid compound, a salt of an azole compound, and from about 25 weight percent to about 35 weight percent water. The additive may optionally include a transition metal compound such as molybdenum-containing compounds to assist in corrosion inhibition. Other additives such as dyes, defoaming agents, biocide agents, and buffers may be included in the composition. The additive, in the absence of extreme temperature storage and shipping conditions, generally remains flowable and homogeneous. The additive can be introduced into a major amount of a coolant fluid such as ethylene glycol, water, or similar liquid, to form an engine coolant formulation with the aid of simple mixing equipment.

Another aspect of the invention is directed to a method of making an engine coolant additive that includes a salt of a monobasic carboxylic acid compound, a salt of an azole compound and from about 25 weight percent to about 35 weight percent water.

DETAILED DESCRIPTION OF THE INVENTION

In its broader aspects, the invention is directed to an engine coolant additive comprising a salt of a monobasic carboxylic acid compound, a salt of an azole compound, and water in an amount not to exceed from about 25 weight percent to about 35 weight percent. In one embodiment, the salt of a monobasic carboxylic acid compound is present in the engine coolant additive in a range from about 40 weight percent to about 70 weight percent based on the molecular weight of the monobasic carboxylic acid. In one embodiment, the salt of an azole compound is present in a range from about 1 weight percent to about 10 weight percent based on the salt. In one embodiment, the azole compound comprises at least three nitrogen atoms.

An aspect of the invention is directed to a liquid, monobasic carboxylic acid based engine coolant additive. The engine coolant additive is formulated to minimize the volume of liquid necessary to maintain the solid components in solution and decrease the volume of the additive formulations. But, it is readily combinable with a coolant liquid such as ethylene glycol, water, other similarly functioning materials, and mixtures thereof, to produce an engine coolant formulation. This additive can be categorized as a super-concentrate. The engine coolant additive includes a salt of a monobasic carboxylic acid and a salt of an azole compound, wherein in one embodiment the azole compound comprises at least three nitrogen atoms. About 25 weight percent to about 35 weight percent of the engine coolant additive is water, encompassing the water contribution from all component sources. This range by weight of water represents a minimum mass of water capable of maintaining the components of the engine coolant additive in solution.

The additive is formulated to have an alkaline pH. The monobasic acid component of the engine coolant additive is a $C_3$-$C_{16}$ monobasic carboxylic acid, and under alkaline conditions would be present in the additive as a salt. To assist in maintaining the desired solubility of the engine coolant additive, the preferred embodiment of the instant invention utilizes a salt of an aliphatic monobasic carboxylic acid in the range of from about $C_6$ to about $C_{12}$. Preferably, the salts are formed from monobasic carboxylic acids such as one or more of the following acids or isomers: hexanoic, heptanoic, isoheptanoic, octanoic, 2-ethylhexanoic, nonanoic, decanoic, undecanoic, dodecanoic, neononanoic, neodecanoic, and/or combinations thereof. A preferred composition uses 2-ethylhexanoic acid. Preferably, a metal hydroxide or ammonium hydroxide may be used to form the monobasic salt; however, the metals sodium and potassium are preferred, and the potassium salt is most preferred. The monobasic acid or analogous alkali metal salt of the monobasic acid of the present invention is used in a concentration between about 40 weight percent and about 70 weight percent, more preferably between about 40 weight percent and about 55 weight percent, and still more preferably between about 45 weight percent and about 50 weight percent, based upon the free acid molecular weight relative to the total weight of the engine coolant additive.

As discussed briefly above, the salt of the monobasic carboxylic acid may be formed by mixing the acid with either a metal hydroxide or ammonium hydroxide, or combinations of these hydroxides. In an exemplary embodiment, the engine coolant additive is formulated with a metal hydroxide or ammonium hydroxide in a range between 15 percent by weight to about 30 percent by weight of the engine coolant additive. In another embodiment, the metal hydroxide or ammonium hydroxide is present in a range between 18 percent by weight to about 25 percent by weight of the engine coolant additive. A majority of the water present in the final engine coolant additive is associated with the aqueous solution of metal hydroxide or ammonium hydroxide. In order to minimize the volume of the final engine coolant additive, the metal hydroxide or ammonium hydroxide aqueous solutions are used at high concentrations of the hydroxide material. For example, in some embodiments, about 45 percent up to about 64 percent solutions of potassium hydroxide, sodium hydroxide, or other metal hydroxide or ammonium hydroxide is used. In an embodiment, the metal hydroxide is an alkali metal hydroxide, typically sodium or potassium hydroxide and mixtures thereof. Optionally, an alkaline earth metal hydroxide, or a mixture of alkaline earth metal hydroxides, can be used. If the metal hydroxide is used in solid form, a percentage of water is slowly added with stirring to the solid metal hydroxide with evolution of heat. Once the desired amount of water is added, and adjusted for any loss of water vapor, the aqueous metal hydroxide solution is then slowly reacted with the monobasic carboxylic acid in liquid form with evolution of heat, to four an aqueous solution of the monobasic carboxylic acid metal salt. In an embodiment, water is added to the metal hydroxide in a range between about 25 weight percent and about 40 weight percent by weight of the final monobasic carboxylic acid salt. In another embodiment, water is added to the mixture in a range between about 18 weight percent and 25 weight percent by weight of the final monobasic carboxylic acid salt.

The metal hydroxide also functions to achieve the desired pH for the additive, in the range of greater than 7.0 to 14.0. Other pH adjusting or controlling compounds may be added such as basic and/or acidic compounds, i.e. NaOH, KOH or $NH_4OH$ to reach the final desired pH value.

Azole compounds are present in the formulation, in the form of a salt, to inhibit corrosion of yellow metal like copper and brass. Brass thermostats and radiator caps are common in automobile engines, as well as copper and brass radiators. In one embodiment, the azole compound comprises at least three nitrogen atoms. The hydrocarbyl triazole of the instant invention is preferably an aromatic triazole or alkyl-substituted aromatic triazole, preferably benzotriazole or tolyltriazole (typically a mixture of 4-methylbenzotriazole and 5-methylbenzotriazole). The preferred hydrocarbyl triazole is tolyltriazole. The azole compound providing protection for copper and brass from corrosion can be selected from among the water-soluble triazoles, pyrazoles, isooxazoles, isothiazoles, thiazoles, thiadiazoles, and the like. Generally, the alkali metal salts of the azole compounds are used. Specific preferred azole compounds include salts of 1,2,3-benzotriazole and 1,2,3-tolyltriazole, which will react with basic materials in the composition to form the azole salts. Typically, these azoles are incorporated into the additive as a fifty percent solution in caustic, such as in a 50% solution of sodium hydroxide in water. Thus, to prepare the azole solution prior to incorporation into the coolant additive, the azole in solid form is slowly added to an equal weight of a 50% solution of sodium hydroxide in water.

It is contemplated that certain azoles such as sodium 2-mercaptobenzimidazole and sodium imidazole define substituted and unsubstituted azoles containing two nitrogen atoms which provide an active azole molecule to combine with hydrogen to provide a neutralizing or buffering capability when used with a carboxylic acid. The hydrocarbyl triazoles utilized in embodiments of the invention contain three nitrogen molecules and can be more substituted and thus less active than the two-nitrogen imidazole, and would therefore be less corrosive to engine components and seals. Salts of the selected less active and more stable azole compounds in the instant formulation are thus important as corrosion inhibitors for protecting yellow metal.

The azoles are preferably present in the formulation in an amount of about 1 percent by weight to about 10 percent by weight. More preferably they are present in an amount of about 2 percent by weight to about 8 percent by weight. Even more preferably they are present in an amount of about 2 percent by weight to about 6 percent by weight. Generally, a solid azole compound is first dissolved in a caustic solution, such as 50% by weight sodium hydroxide in water, to generate a 50% sodium azole solution. Thus, a 50% sodium tolyltriazole solution is made by dissolving solid tolyltriazole in a 1:1 ratio by weight with 50% aqueous NaOH solution. This solution is then used in the coolant additive in amounts of about 2 parts by weight to about 20 parts by weight solid azole, based on 100 parts by weight of the engine coolant additive to achieve the desired concentration. In an embodiment, the solid azole, such as tolyltriazole, is present at 4.025 parts based on 100 parts by weight of the engine coolant additive.

Transition metal compounds are also used to inhibit corrosion in formulations of the present invention. The water-soluble transition metal compounds such as water soluble molybdate, which is preferred for use in the aqueous systems of the present invention, can be any salt of molybdic acid ($H_2MoO_4$) that is readily soluble in water. These include both alkali metal and alkaline earth metal molybdates as well as ammonium molybdate, all of which are referred to herein as "alkali molybdate." Examples of useful alkali and other molybdates are sodium molybdate, potassium molybdate, lithium molybdate, molybdenum trioxide, ammonium molybdates such as ammonium dimolybdate and ammonium heptamolybdate, heteropolymolybdates such as silicoheteropolymolybdates and phosphoroheteropolymolybdates, and mixtures thereof. Other compatible transition metal compounds may be used alone or in combination, including for example, compounds containing cobalt, cerium, mixtures thereof and the like. In addition, any salt of these transition metal compounds may be used including those containing sodium, potassium, lithium, calcium, magnesium and the like. The most preferred transition metal compound is sodium molybdate.

The transition metal compound is present in the engine coolant additive in an amount of about 0.01 percent by weight to about 10 percent by weight of the engine coolant additive, and more preferably in an amount of about 0.1 percent by weight to about 1 percent by weight. The transition metal compound is employed in the coolant additive in amounts so as to provide about 5 ppm to about 5000 ppm of the transition metal compound in the final engine coolant formulation.

The engine coolant additive may optionally include a defoaming agent. Any suitable defoamer, well known in the art, is suitable for the present formulations. Suitable defoamers include, for example, an organomodified polydimethylsiloxane-containing polyalkylene glycol, siloxane polyalkylenoxide copolymer, and polyalkylene oxide. Such defoamers are commercially available as Silbreak® 320 (from Momentive Performance Materials, Inc., Friendly, W. Va., and identified as an organomodified polydimethylsiloxane), Plurafac® LF 224 (commercially available from BASF Corporation, Florham Park, N.J., and identified as a low foaming nonionic surfactant, consisting of alkoxylated, predominantly unbranched fatty alcohols, containing higher alkene oxides alongside ethylene oxide), PLURONIC® L-61 non-ionic surfactant (commercially available from BASF Corporation, and identified as an ethylene oxide/propylene oxide block copolymer) or PATCOTE® 415 liquid defoamer (commercially available from Patco Specialty Chemicals, Division, American Ingredients Company, Kansas City, Mo., and identified as a non-silicone liquid defoamer). The defoamer may be present in the coolant additive in an amount up to about 10.0 percent by weight and is preferably present in an amount of about 0.01 percent by weight to about 10 percent by weight and more preferably in an amount of about 0.1 percent by weight to about 10 percent by weight, and most preferably, in an amount of about 0.1 to about 5 percent by weight of the engine coolant additive. Alternatively, the defoaming agent may be added directly to the coolant liquid.

Other components such as bittering agents, dyes, tracers, or biocides may also optionally be added directly to the coolant liquid, and thus not constitute a part of the engine coolant additive. Or, one or more of these components may be incorporated into the engine coolant additive, as desired.

The engine coolant additive is prepared by slowly mixing the monobasic carboxylic acid with the metal hydroxide or ammonium hydroxide. Care is taken to dissipate the heat generated by the exothermic reaction and heat of solution between these components. Typically, the metal hydroxide or ammonium hydroxide is dissolved in a minimal amount of water which is then slowly added to the monobasic carboxylic acid while mixing. For example, a 45% solids by weight aqueous solution of potassium hydroxide may be added to the monobasic carboxylic acid, preferably a liquid monobasic carboxylic acid such as 2-ethylhexanoic acid. Once the desired amount of metal hydroxide or ammonium hydroxide is mixed with the monobasic carboxylic acid, the remaining components may be added while mixing.

Before use in an engine, the prepared engine coolant additive may be diluted with a major amount of a liquid suitable for use as an engine coolant, such as water, ethylene glycol or other liquid alcohol freeze point depressant including but not limited to propylene glycol or glycerine. The diluted engine coolant additive provides for an engine coolant having a pH typically greater than 7.0 to about 12.0 and having about 92% to about 99% coolant liquid and about 1% to about 8% engine coolant additive. For engine coolants having ethylene glycol as the coolant liquid, the engine coolant additive is used at a concentration of about 4% by volume to about 8% by volume based on the total volume of the engine coolant formulation. For engine coolant formulations having either water or mixtures of water with ethylene glycol as the coolant liquid, the engine coolant additive is used at a concentration of about 1% by volume to about 3% by volume based on the total volume of the engine coolant formulation.

The freezing point depressant utilized in the antifreeze compositions of the invention can be any suitable liquid alcohol used heretofore in formulating antifreeze compositions. The alcohol contains 1 to about 4 carbon atoms and 1 to about 3 hydroxy groups per molecule. The glycols or glycol ethers which may be used as major components with the present invention include glycol monoethers such as the methyl, ethyl, propyl, and butyl ethers of ethylene glycol; diethylene glycol; propylene glycol; dipropylene glycol; glycerine; and mixtures thereof.

Ethylene glycol or propylene glycol is preferred as the freezing point depressant and especially the commercially available mixtures containing largely ethylene glycol and a small amount of diethylene glycol. The commercial mixture generally contains at least 85 to 95% by weight of ethylene glycol with the remainder being diethylene glycol and small amounts of substances which are incidentally present such as water. Other liquid alcohols can be admixed with ethylene glycol but such mixtures usually are not preferred. Inexpensive commercially available alcohols can also be used such as methyl, ethyl, propyl, and isopropyl alcohol, alone or in mixtures.

The following detailed example illustrates the practice of the invention in an embodied form, thereby enabling a person of ordinary skill in the art to practice the invention. The principles of this invention, its operating parameters and other obvious modifications can be understood in view of the following detailed procedure.

Example

A 1 kilogram sample of engine coolant additive was prepared with the components listed in the Table below.

| Component | Mass |
| --- | --- |
| Potassium hydroxide (as 45% solids in water) | 402.7 g |
| 2-Ethylhexanoic acid | 483.2 g |
| Sodium Tolyltriazole (in 50% aq. NaOH solution; present as 40.25 g tolyltriazole in 40.25 g 50% aq. NaOH) | 80.5 g |
| Sodium Molybdate | 31.3 g |
| Plurafac ® LF 224 | 1.52 g |
| Silbreak 320 | 0.78 g |

The 2-ethylhexanoic acid was slowly added to the potassium hydroxide solution at a rate to combat the loss of $H_2O$ and to control the exothermic nature of the blending. The remaining components were added while mixing in the order presented in the Table. The pH of the final formulation was 11.51, the specific gravity (i.e., the ratio of the final formulation density to that of distilled water at 4° C.) was 1.14, and the formulation was stable at room temperature, i.e., the components stayed in solution as a single phase. For purposes of defining stability of the additive, it should maintain a single phase at room temperature for at least 1 month. The above engine coolant additive included the calculated mass of 307.3 grams of water, either present in an initially-introduced solution, or generated by reaction.

The above additive as prepared was then introduced into a mixing vessel with a major amount of a coolant liquid, in this instance, ethylene glycol. The prepared additive was combined at room temperature with the ethylene glycol with simple mechanical agitation to produce an engine coolant.

It was surprisingly and unexpectedly observed that the components used in the engine coolant additive could be mixed together at such concentrated levels without the addition of ethylene glycol. No additional water or other solvents were needed to solubilize the components of the engine coolant additive.

While the invention has been described in conjunction with specific embodiments thereof, it is evident that many alternatives, modifications, and variations will be apparent to those skilled in the art in light of the foregoing description. Accordingly, departures may be made from such details without departing from the spirit or scope of the general inventive concept.

What is claimed is:

1. An engine coolant additive comprising:
   a. a salt of an aliphatic monobasic carboxylic acid compound in the range from about $C_6$ to about $C_{12}$, wherein the carboxylic acid is present in a range from about 40 weight percent to about 70 weight percent of the engine coolant additive based on the molecular weight of the carboxylic acid;
   b. a salt of an azole compound; and
   c. water, in an amount from about 25 weight percent to about 35 weight percent;
   wherein the engine coolant additive excludes other solvents.

2. The engine coolant additive of claim 1 wherein said carboxylic acid is selected from the acid group consisting of hexanoic, heptanoic, isoheptanoic, octanoic, 2-ethylhexanoic, nonanoic, decanoic, neononanoic, undecanoic, dodecanoic, neodecanoic, and combinations thereof.

3. The engine coolant additive of claim 1 wherein a metal hydroxide or ammonium hydroxide is used to form the monobasic salt from the carboxylic acid selected from the group consisting of hexanoic, heptanoic, isoheptanoic, octanoic, 2-ethylhexanoic, nonanoic, decanoic, neononanoic, undecanoic, dodecanoic, neodecanoic, and combinations thereof.

4. The engine coolant additive of claim 1 wherein the azole compound comprises at least three nitrogen atoms.

5. The engine coolant additive of claim 1 wherein the azole compound is present in a range from about 1 weight percent to about 10 weight percent.

6. The engine coolant additive of claim 1 further comprising a transition metal compound.

7. The engine coolant additive of claim 6, wherein said transition metal compound is present in an amount of from about 0.01 percent by weight to about 10 percent by weight.

8. The engine coolant additive of claim 6 wherein said transition metal compound is a molybdate compound selected from the group consisting of sodium molybdate, potassium molybdate, lithium molybdate, ammonium molybdate, ammonium dimolybdate, ammonium heptamolybdate, molybdenum trioxide, heteropolymolybdates, silicoheteropolymolybdates, phosphoroheteropolymolybdates, and mixtures thereof.

9. The engine coolant additive of claim 1 including an effective amount of a defoamer.

10. The engine coolant additive of claim 1 including an effective amount of a dye.

11. The engine coolant additive of claim 1 including an effective amount of a buffering agent.

12. The engine coolant additive of claim 1 including an effective amount of a biocide agent.

13. The engine coolant additive of claim 1 wherein said water does not exceed about 31% weight percent.

14. The engine coolant additive of claim 1 wherein said engine coolant additive has a pH in a range of greater than 7.0 to 14.0.

15. A method of making an engine coolant additive, the method comprising:
   a) mixing an aqueous solution of at least one of a metal hydroxide or ammonium hydroxide with an aliphatic monobasic carboxylic acid in the range from about $C_6$ to about $C_{12}$ to form a salt of the carboxylic acid; and
   b) adding an azole compound to the mixture from step a), wherein the salt of the carboxylic acid is present in the formulation in a range from about 40 weight percent to about 70 weight percent of the engine coolant additive based on the molecular weight of the carboxylic acid and the formulation includes water in a range from about 25 weight percent to about 35 weight percent;
   wherein the engine coolant additive excludes other solvents.

16. The method of claim 15 wherein the carboxylic acid is selected from the group consisting of hexanoic, heptanoic, isoheptanoic, octanoic, 2-ethylhexanoic, nonanoic, decanoic, undecanoic, dodecanoic, neodecanoic, and/or combinations thereof.

17. The method of claim 15 further comprising the addition of a transition metal compound.

18. The method of claim 17 wherein said transition metal compound is a molybdate compound and is selected from the group consisting of sodium molybdate, potassium molybdate, lithium molybdate, ammonium molybdate, ammonium dimolybdate, ammonium heptamolybdate, molybdenum trioxide, heteropolymolybdates, silicoheteropolymolybdates, phosphoroheteropolymolybdates, and mixtures thereof.

19. The method of claim 15 further comprising the addition of an effective amount of a defoaming agent.

20. The method of claim 15 further comprising the addition of an effective amount of a dye.

21. The method of claim 15 further comprising the addition of an effective amount of a buffering agent.

22. The method of claim 15 further comprising the addition of an effective amount of a biocide agent.

23. The method of claim 15, wherein said water does not exceed about 31% weight percent.

24. The method of claim 15 wherein the azole compound comprises at least three nitrogen atoms.

25. An engine coolant additive composition consisting essentially of:
   a. a salt of an aliphatic monobasic carboxylic acid compound in the range from about $C_6$ to about $C_{12}$, wherein the carboxylic acid is present in a range from about 40 weight percent to about 70 weight percent of the engine coolant additive based on the molecular weight of the carboxylic acid;
   b. a salt of an azole compound;
   c. water, in an amount from about 25 weight percent to about 35 weight percent; and
   d. optionally an effective amount of at least one of a transition metal compound, a defoamer, a dye, a buffering agent, a biocide agent, and a bittering agent; wherein the engine coolant additive excludes other solvents.

* * * * *